US011114824B2

(12) United States Patent
Muniraju et al.

(10) Patent No.: US 11,114,824 B2
(45) Date of Patent: Sep. 7, 2021

(54) PREFABRICATED SUPPORT FOR A RACK-MOUNTABLE ELECTRICAL DEVICE AND ELECTRICAL DEVICE COMPRISING SUCH A SUPPORT

(71) Applicant: Schneider Electric Industries SAS, Rueil Malmaison (FR)

(72) Inventors: Pradeep Muniraju, Grenoble (FR); Bruno Gasparetti, Tours en Savoie (FR); Jérôme Corbalan, La Chapelle Blanche (FR); Louis Linares, La Terrasse (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 57 days.

(21) Appl. No.: 16/696,264

(22) Filed: Nov. 26, 2019

(65) Prior Publication Data
US 2020/0185894 A1 Jun. 11, 2020

(30) Foreign Application Priority Data

Dec. 11, 2018 (FR) ...................... 1872704

(51) Int. Cl.
*H02B 1/36* (2006.01)
*H02B 1/21* (2006.01)
*H02B 11/127* (2006.01)

(52) U.S. Cl.
CPC ................. *H02B 1/36* (2013.01); *H02B 1/21* (2013.01); *H02B 11/127* (2013.01)

(58) Field of Classification Search
CPC ............ H01H 9/02; H01H 35/02; H01H 9/10; H01H 33/666; H01H 37/54; H01H 9/52;
(Continued)

(56) References Cited

U.S. PATENT DOCUMENTS 3,742,305 A * 6/1973 Hobson, Jr. ............ H01H 83/14
361/46
4,870,542 A * 9/1989 Koslosky ............... H02B 1/056
361/640

(Continued)

FOREIGN PATENT DOCUMENTS

EP 2309611 4/2011
FR 2776465 9/1999

OTHER PUBLICATIONS

English Language Machine Translation of European Patent Publication No. EP2309611 dated Apr. 13, 2011, 17 pages.

(Continued)

*Primary Examiner* — Adam B Dravininkas
(74) *Attorney, Agent, or Firm* — Locke Lord LLP

(57) ABSTRACT

A prefabricated support comprises a one-piece body defining a reception housing intended to receive an electrical switching apparatus and also delimiting a passage in which electrical conductors are housed, the body comprising a separating wall, the wall and at least one side of the plate forming a lateral face of the support, the lateral face comprising at least one first fixing member and at least one second fixing member, each second fixing member being of a form complementary to the first fixing member, each first member and each second member being adapted to be engaged with, respectively, another second member and another first member.

10 Claims, 7 Drawing Sheets

(58) Field of Classification Search
CPC .. H01H 2071/7481; H01H 13/02; H02B 1/00; H02B 5/06; H02B 13/035; H02B 1/21; H02B 1/46; H02B 1/50; H02B 11/04; H02B 11/00; H02B 13/0352; H02B 1/056; H02B 1/36; H02B 11/127; H02B 11/26

See application file for complete search history.

(56) References Cited

U.S. PATENT DOCUMENTS

| | | | | |
|---|---|---|---|---|
| 5,464,352 A | * | 11/1995 | Van Emmerick | H01R 4/2433 439/404 |
| 6,075,692 A | | 6/2000 | Potonniee et al. | |
| 6,135,804 A | * | 10/2000 | Lux | H01R 4/2433 439/397 |
| 6,331,684 B1 | * | 12/2001 | Abroy | H01H 21/42 200/17 R |
| 9,515,459 B2 | * | 12/2016 | Sinistro | H02B 7/06 |
| 2014/0284310 A1 | * | 9/2014 | Gerving | H01H 9/443 218/26 |
| 2016/0006223 A1 | * | 1/2016 | Sinistro | H02B 1/041 361/622 |
| 2016/0104978 A1 | * | 4/2016 | Chaumeny | B60L 53/16 439/620.22 |
| 2017/0324176 A1 | * | 11/2017 | Ishikawa | H01R 13/6595 |
| 2018/0166227 A1 | * | 6/2018 | Comtois | H01H 9/02 |
| 2019/0006824 A1 | * | 1/2019 | Sasaki | H02B 3/00 |

OTHER PUBLICATIONS

Search Report and Written Opinion for French Patent Application No. FR1872704 dated Aug. 16, 2019, 7 pages.

* cited by examiner

PREFABRICATED SUPPORT FOR A RACK-MOUNTABLE ELECTRICAL DEVICE AND ELECTRICAL DEVICE COMPRISING SUCH A SUPPORT

TECHNICAL FIELD

The present invention relates to a prefabricated support for a rack-mountable electrical device and a rack-mountable electrical device comprising such a support.

BACKGROUND

Rack-mountable electrical devices are known that generally take the form of withdrawable units that are intended to be mounted in a corresponding housing, or rack, of an electrical cabinet. The patent FR-2 776 465 B1 describes an example of a rack-mountable electrical device for an electrical distribution installation. This electrical device comprises one or more electrical apparatuses, such as electrical switching apparatuses, mounted on a deck serving as support.

One drawback of these known devices lies in the fact that they have to be tailor-made according to the application for which they are intended.

There is therefore a need for a similar rack-mountable electrical device which has a simplified design.

SUMMARY

It is this problem that the invention sets out more particularly to remedy, by proposing a novel prefabricated support for a rack-mountable electrical device. To this end, the invention relates to a prefabricated support for a rack-mountable electrical device, the support comprising a plate, a one-piece body mounted on the plate, an electrical connector, placed on a rear face of the prefabricated support and preformed electrical conductors each comprising a first end and a second end, the body defining, on the front face of the support, a reception housing intended to receive an electrical switching apparatus, the body also delimiting a passage in which the electrical conductors are housed, each first end of each electrical conductor being connected to the electrical connector and each second end of each electrical conductor emerging inside the reception housing, the body comprising an electrically insulating separating wall extending at right angles from an edge of the plate, said wall and at least one side of the plate forming a lateral face of the support, said lateral face comprising at least one first fixing member and at least one second fixing member, each second fixing member being of a form complementary to the first fixing member, each first member and each second member being adapted to be engaged with, respectively, another second member and another first member.

By virtue of the invention, such a support makes it possible to construct electrical devices in a modular way, involving a limited number of parts, the parts being prefabricated and with dimensions that are known in advance. Such prefabricated parts offer the advantage of being able to be produced in large quantities with relatively low manufacturing costs.

According to advantageous but non-mandatory aspects of the invention, such a support can incorporate one or more of the following features, taken in any technically admissible combination:

the first fixing member is made of a single piece with the body and the second fixing member is made of a single piece with the plate.

the body and the plate are produced in an electrically insulating material.

the first and second members are adapted to be engaged with, respectively, another second member and another first member.

According to another aspect, another subject of the invention is an electrical device comprising at least one prefabricated support as described previously and an electrical switching apparatus, the electrical switching apparatus being disposed at least partially in the reception housing of the at least one prefabricated support and being connected electrically to the second end of the electrical conductors of the at least one prefabricated support.

According to advantageous but non-mandatory aspects of the invention, such an electrical device can incorporate one or more of the following features, taken in any technically admissible combination:

the device comprises a single prefabricated support as defined previously; an additional, electrically insulating partition fixed to the separating wall and comprising a first fixing member and a second fixing member that are similar to, respectively, the first and second members of said support, the first member and the second fixing member of the electrically insulating partition being fitted, respectively, with the second member and the first member of the separating wall, so as to fix the partition to the separating wall.

the device comprises a first prefabricated support as defined previously; a second prefabricated support as defined previously, identical or similar to the first prefabricated support, the second support being fixed to the first support, the first member of the first support being engaged with the second member of the second support and the second member of the first support being engaged with the first member of the second support and the respective separating walls of the two supports being juxtaposed and in contact with one another, thus defining a contact surface.

the device further comprises a cap fixed to the first and second supports on the front face of the device.

the device further comprises two gripping handles, each handle being respectively secured to one of said supports, each handle protruding relative to the front face of each support, the handles being identical and disposed symmetrically to one another relative to one and the same joining plane formed by the contact surface between the two supports.

at least one of said handles comprises a mechanism for indexing the position of the electrical device in a rack, the handle being equipped with a manual control trigger for this mechanism.

BRIEF DESCRIPTION OF THE DRAWINGS

The invention will be better understood and other advantages thereof will become more clearly apparent in light of the following description, of several embodiments of the invention in accordance with its principle, given purely by way of example and with reference to the attached drawings in which.

DETAILED DESCRIPTION

Figure 1:
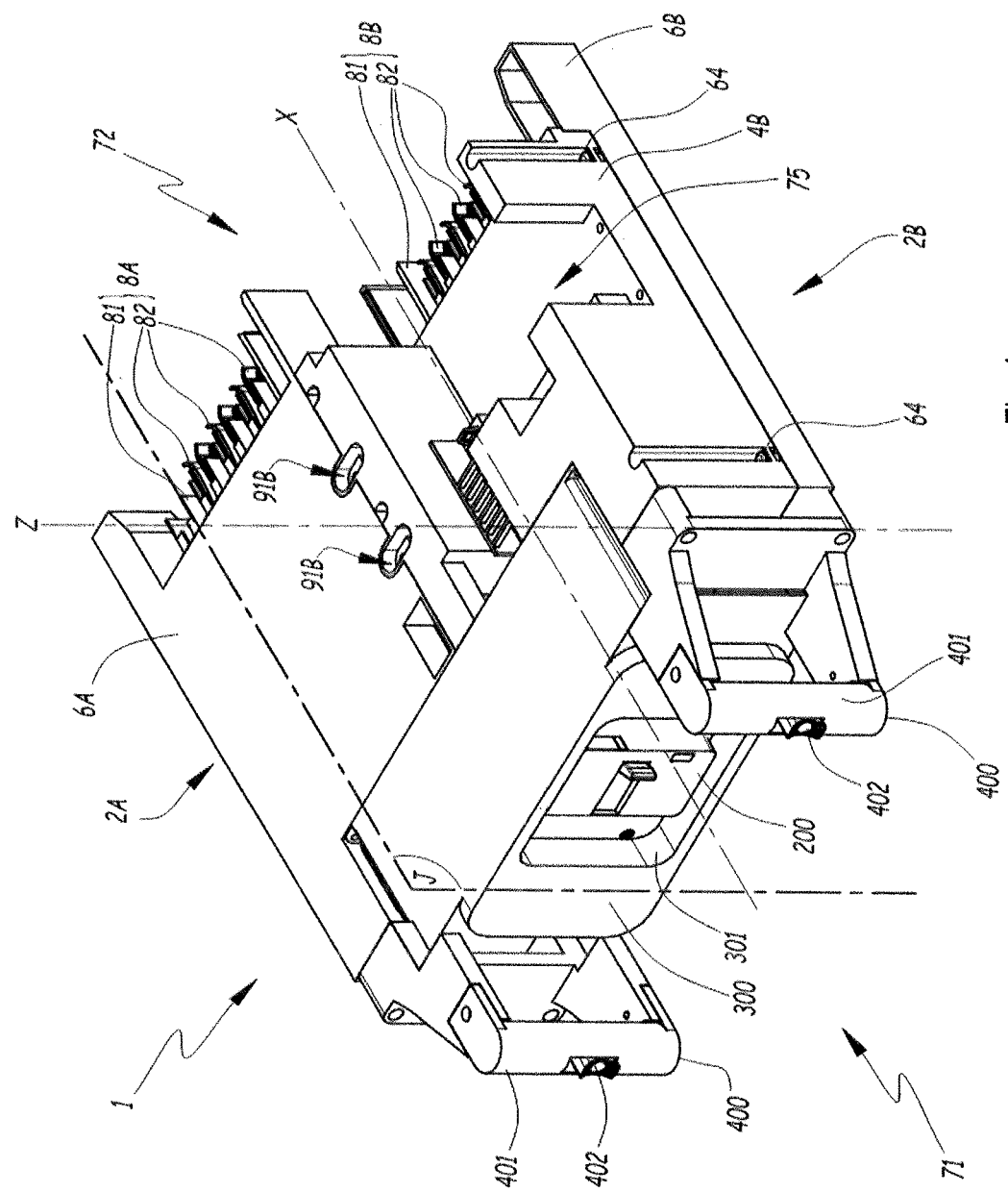
FIG. 1 is an isometric view of an electrical device according to a first embodiment of the invention.
Figure 2:
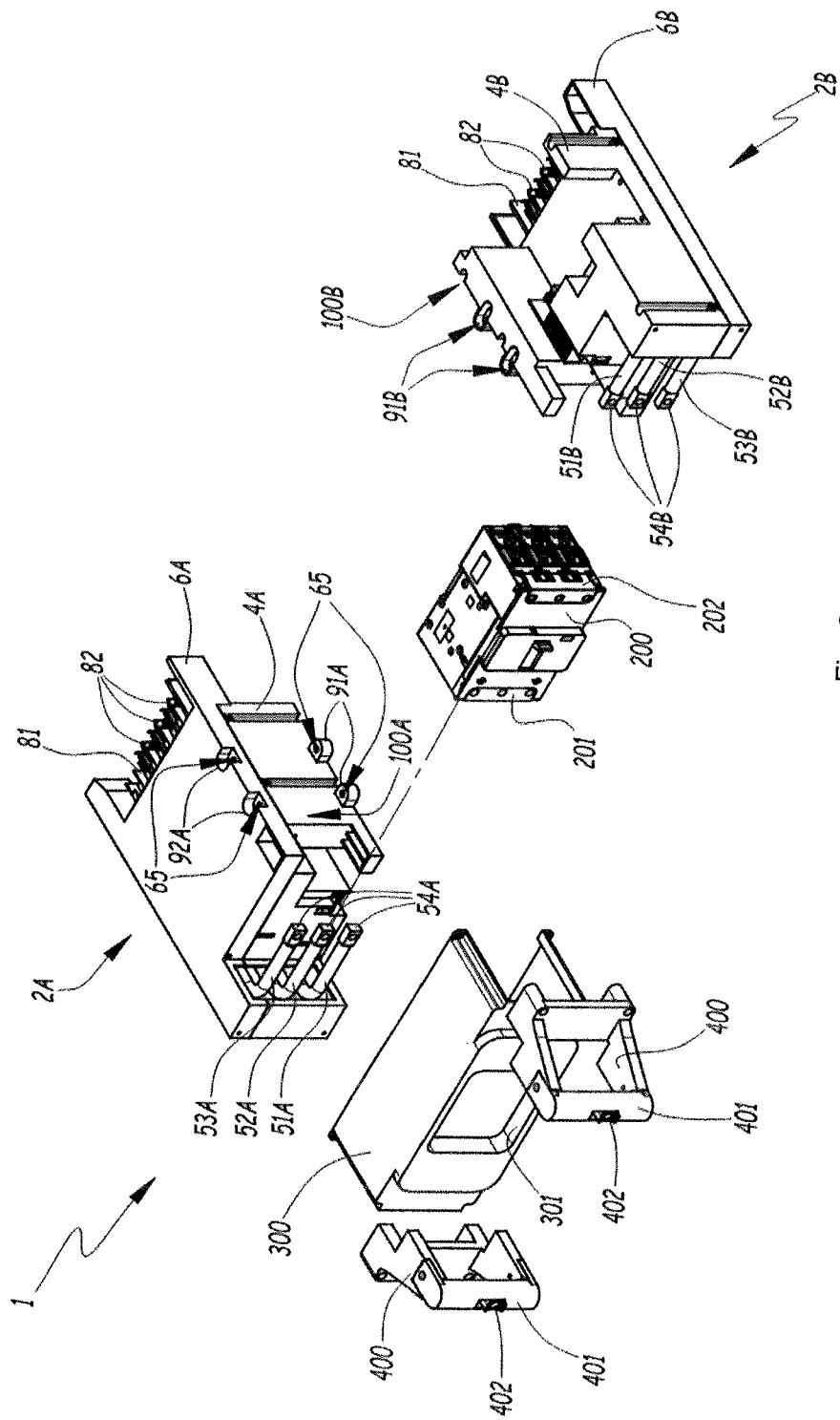
FIG. 2 is an exploded view of the electrical device of FIG. 1.

FIGS. 1 and 2 represent a rack-mountable electrical device 1.

"Rack-mountable" is understood to mean here that the electrical device 1 can be reversibly inserted into or withdrawn from an electrical installation such as an electrical cabinet (or "rack") comprising mounting racks forming reception housings.

For example, the electrical device 1 can be inserted into or removed from a mounting rack by a translational movement along a longitudinal axis X, in the manner of a drawer.

According to examples, the electrical device 1 can thus be displaced between a connected position, in which it is electrically connected to a power conductor of the electrical installation, and a disconnected position, in which it is isolated from said conductor of the electrical installation.

According to variants, the electrical device 1 can also be in an intermediate position between the connected and disconnected positions, called test position. In this intermediate position, the device 1 is isolated from said power conductor while being connected to a low-voltage data and/or control link of the electrical installation.

As an illustrative example, the electrical installation can be an electricity distribution installation including power electrical conductors such as conductive busbars, for distributing an electrical current.

For example, the intensity of the electrical current circulating in the power electrical conductors is greater than or equal to 50 A, or greater than or equal to 100 A.

As will be understood on reading the following description, the device 1, illustrated in FIGS. 1 and 2 according to a first embodiment, comprises, among other things, a first prefabricated support 2A and a second prefabricated support 2B, that are preferably similar or identical, designated generally by the reference 2.

As will be understood on reading the following description, the supports 2A and 2B are fixed to one another and together form a reinforcement of the device 1.

The device 1 also comprises an electrical apparatus 200, described hereinbelow, which is associated with the prefabricated supports 2A and 2B.

The apparatus 200 is intended to be connected with the electrical installation when the device 1 is in connected position. For example, the apparatus 200 is an electrical switching and/or protection apparatus, such as a circuit breaker, or a contactor, or a disconnector, or a relay, or even other examples.

For example, the apparatus 200 comprises upstream electrical connection lands 201 and downstream electrical connection lands 202.

The apparatus 200 can also comprise, on the front, a control member, such as a lever or a button, or an indicator, such as an indicator lamp.

Figure 3:
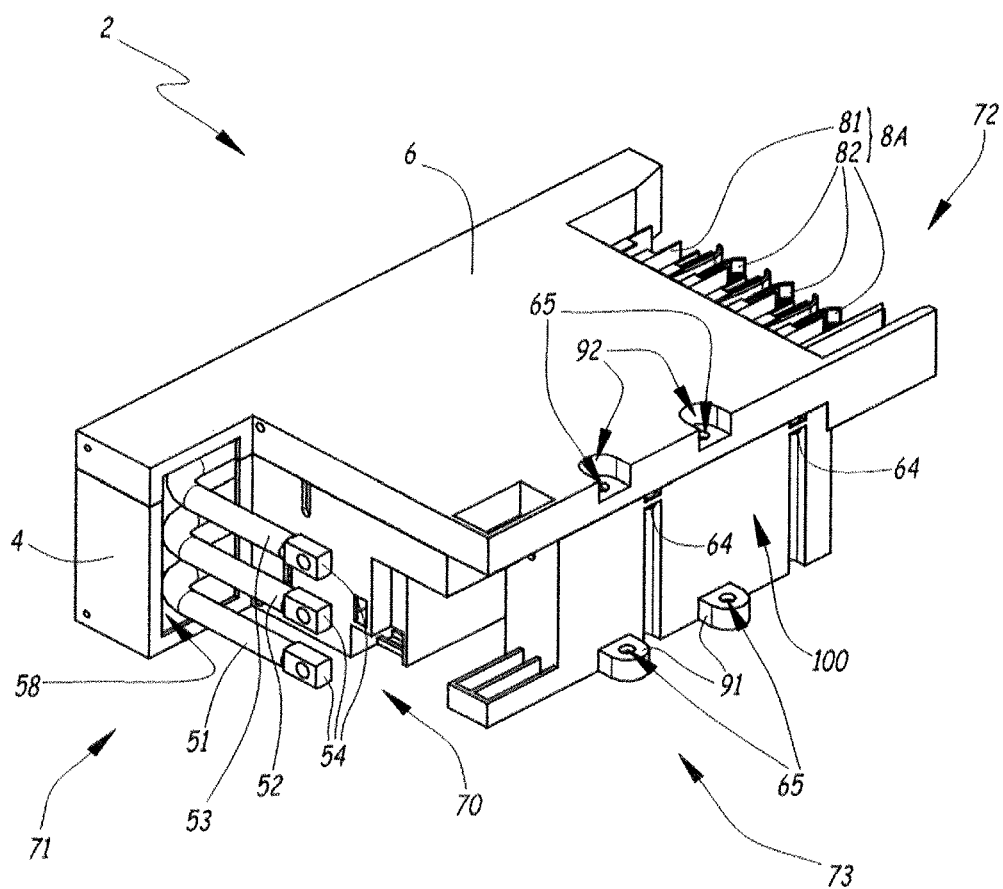
FIG. 3 is an isometric view of a prefabricated support used in the electrical device of FIGS. 1 and 2.
Figure 4:
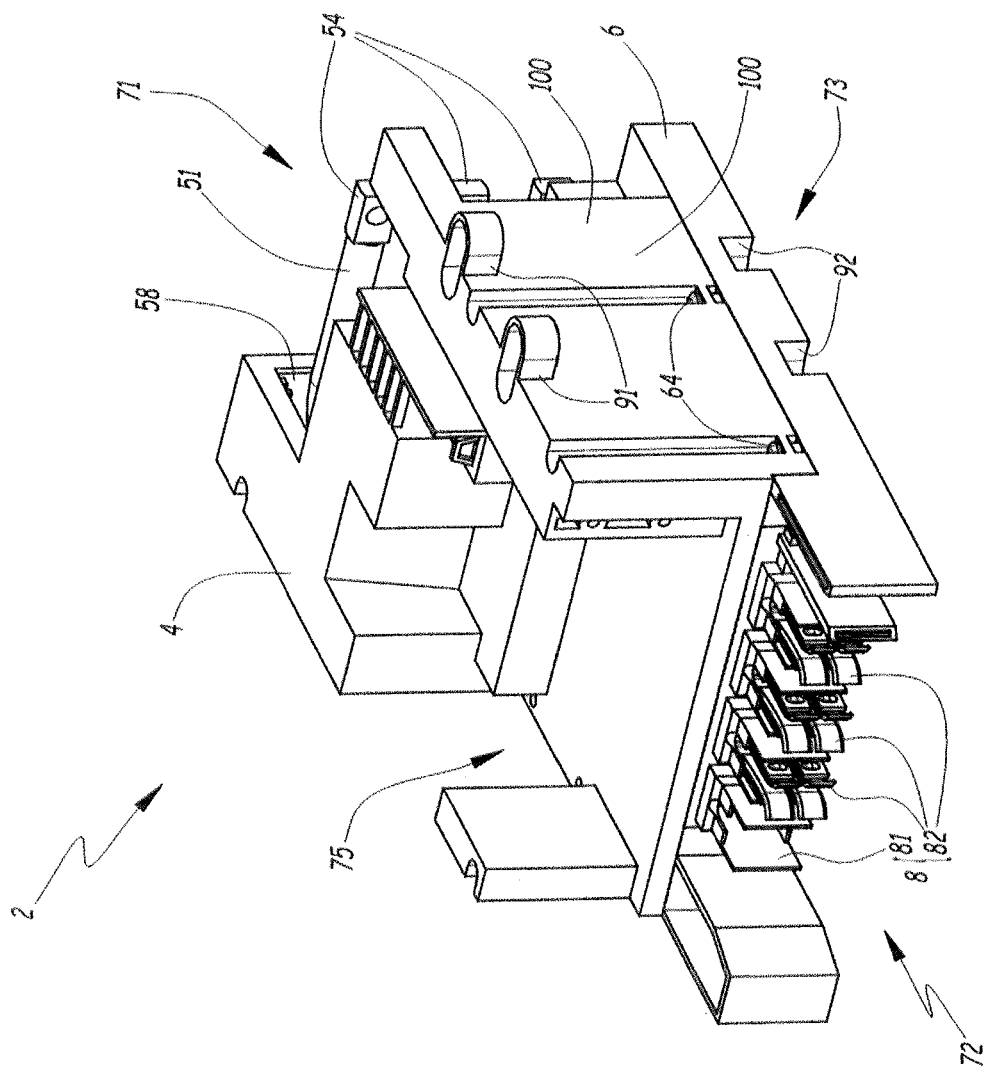
FIG. 4 is an isometric view of the prefabricated support from a different angle.

The prefabricated support 2, represented in isolation in FIGS. 3 and 4, comprises a one-piece body 4 and a rigid plate 6, which is mounted on the body 4, so as to serve as cover.

The body 4 and the plate 6 are for example formed in an electrically insulating material, such as a moulded or thermoset polymer, for example polyamide. The material or materials used for the plate 6 and for the body 4 can be identical to one another or different.

The support 2 is said to be "prefabricated" inasmuch as it is already assembled. In particular, the support 2 makes it possible, through its form and its general design, to serve as basic building block for constructing the device 1.

The support 2 here comprises a front face 71, a rear face 72, parallel to the face 71, and a lateral face 73 which is at right angles to the faces 71 and 72.

The support 2 comprises an electrical connector 8, or power connector, here mounted on the plate 6 on the rear face 72. The connector 8 makes it possible to connect the device 1 to the electrical installation when the device 1 is mounted in connected position.

For example, the electrical connector 8 comprises a base 81 containing electrically conductive clamps 82. In connected position, each clamp 82 grips an electrical conductor of the electrical installation allowing the passage of the current to the device 1. As a variant, the connector 8 can be produced differently.

In practice, when the device 1 is intended to be used in a polyphase electrical installation, the connector 8 comprises at least one clamp 82 per phase.

The body 4 defines a reception housing 70, here situated on the front face 71. The reception housing 70 is intended to receive the electrical switching apparatus 200, for example in such a way that the apparatus 200 is at least partially housed in the reception housing 70.

The plate 6 is advantageously conformed so that, on the front face 71, the edges of the plate 6 are aligned with the edges of the body 4, so as to form an extension of the housing 70.

The device 2 also comprises electrical conductors 51, 52 and 53 for connecting the connector 8 to the apparatus 200. The electrical conductors 51, 52 and 53 are for example housed, and more particularly fixed, inside passages 58 delimited inside the body 4, as emerges more particularly from FIG. 5.

Generally, the conductors 51, 52, 53 are preferentially preformed, so as to present predefined forms and dimensions. The conductors 51, 52, 53 are produced in a conductive material, such as copper, and are, here, rigid.

Each conductor 51, 52 or 53 is here associated with a phase of a polyphase current. In this example, there are three electrical conductors 51, 52 and 53, for conveying a three-phase current, although, as a variant, this number can be different, depending on the nature of the electrical installation.

The conductors 51, 52 and 53 are for example solid or hollow tubular bars, each comprising rectilinear portions, specific to each conductor 51, 52 and 53, the rectilinear portions being extended by bent portions, specific to each conductor 51, 52 and 53. Each conductor 51, 52 and 53 extends between a first end 55 and a second end 54.

The first ends 55 of each electrical conductor 51, 52, 53 are electrically connected to the connector 8. For example, each end 55 is connected electrically to a clamp 82 of the connector 8 via a conductive plate 56, here by means of a screw and a bolt. To ensure a satisfactory contact between each first end 55 and each conductive plate 56, the first end 55 of each conductor 51, 52 and 53 has, for example, a planar form.

Each electrical conductor 51, 52 and 53 emerges in the reception housing 70 at the front face 71 of the support 2, as can be seen in FIG. 2. More specifically, the second ends 54 emerge in the housing 70, protruding relative to the rest of the body 4, so as to be able to be connected to the electrical apparatus 200.

For example, the ends 54 have, here, a flattened head to facilitate connection of the ends 54 to the apparatus 200. It is nevertheless understood that the form of the ends 54 can be adapted according to the nature of the electrical apparatus 200.

Figure 5:
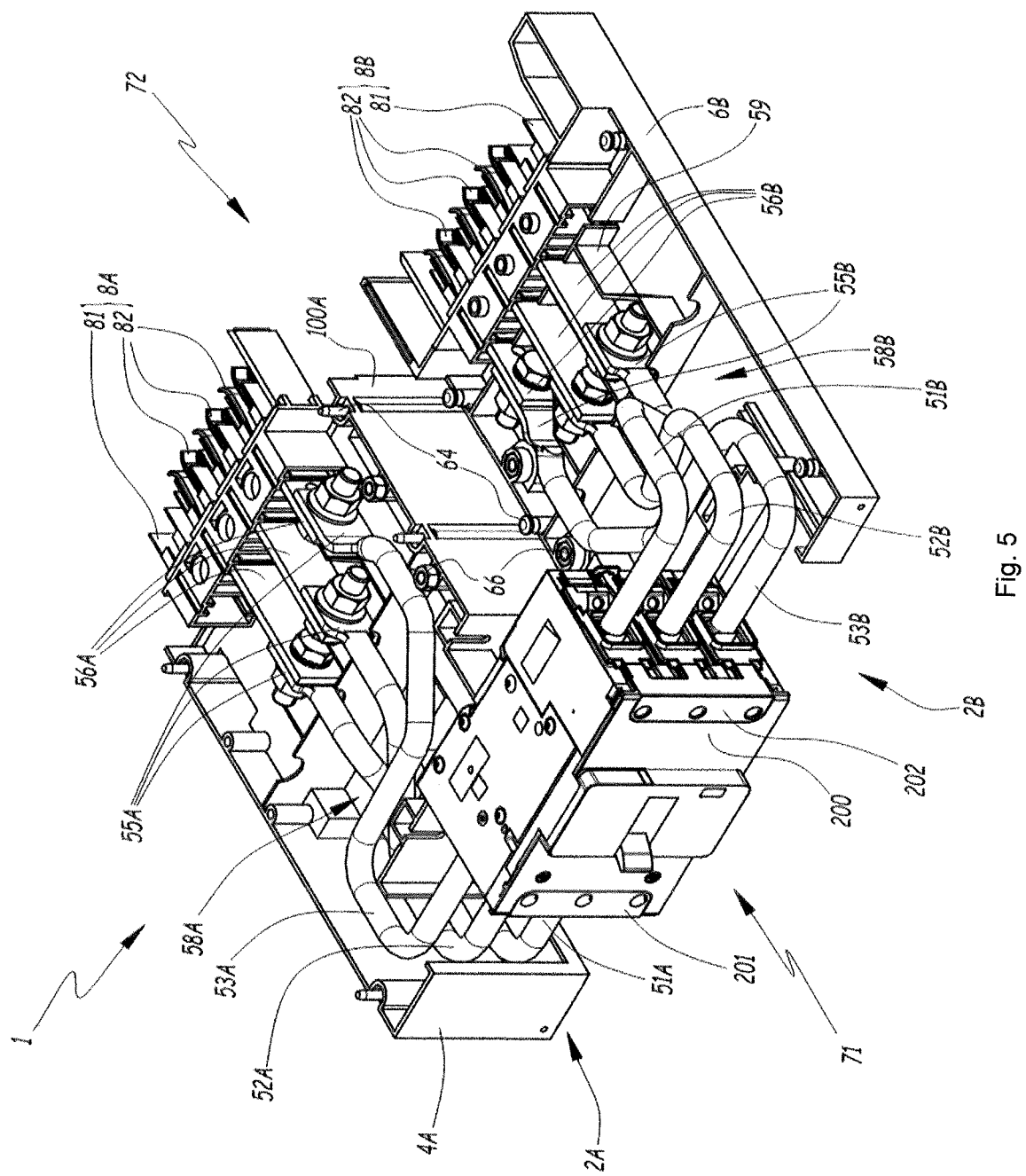
FIG. 5 is a partially cut-away isometric view of the electrical device of FIG. 1.

As illustrated in FIG. 5, the passages 58A and 58B comprise separating partitions 59 which electrically insulate the conductors 51A, 52A and 53A pairwise, and 51B, 52B and 53B pairwise, at least at their ends 55A and 55B in the zone of connection with the connectors 8A and 8B via conductive plates 56A and 56B. Preferably, the separating partitions 59 are formed of a single piece with the rest of the body 4.

As illustrated in FIG. 5, the passages 58 comprise separating partitions 59 which electrically insulate the conductors 51, 52 and 53 pairwise, at least at their ends 55 in the zone of connection with the connector 8. Preferably, the separating partitions 59 are formed of a single piece with the rest of the body 4.

Returning to FIGS. 3 and 4, the body 4 comprises an electrically insulating separating wall 100. The wall 100 extends, here, at right angles to the plate 6 from an edge of the plate 6. The wall 100 and at least one side of the plate 6 together form the lateral face 73 of the support 2. In other words, the lateral face 73 is, here, formed by the joining of the separating wall 100 to at least one side of the plate 6.

For example, one or more grooves are formed in the wall 100 to allow the passage of a tool, such as a screwdriver, thus facilitating the placement and the tightening of one or more elements 64, such as screws, which secure the plate 6 to the body 4.

Particularly advantageously, according to embodiments of the invention, the support 2 is conformed to be fitted with another similar or identical support 2.

For that, the support 2 comprises, here formed on the lateral face 73, at least one first fixing member 91 and at least one second fixing member 92. Each second fixing member 92 has a form complementary to the form of each first fixing member 91.

Each first member 91 is thus capable of being engaged or nested with a corresponding second member 92, for example borne by another body 2. Thus, the fixing members 91 and 92 form an assembly system, for example of tenonmortice type, making it possible to fix the body 2 by fitting with a corresponding structure bearing one or more first members 91 and/or second members 92.

In practice, the lateral face 73 comprises several first members 91 and several second members 92. The number of first members 91 is, here, identical to the number of second members 92.

In the embodiments illustrated, the body 4 comprises two first fixing members 91 and the plate 6 comprises two second fixing members 92. The member or members 91 are made of a single piece with the body 4 and the member or members 92 are made of a single piece with the plate 6.

As a variant, the second member or members 92 can be borne by the body 4, whereas the plate 6 comprises the first fixing member or members 91. According to other variants, the body 4 and the plate 6 can each comprise one or more first members 91 and one or more second members 92. Many other configurations are possible.

Preferably, the fixing members 91 are formed of a single piece with the body 4 and the fixing members 92 are formed of a single piece with the plate 6.

Orifices 65 are, here, provided in the members 91 and 92 to allow the placement of securing means 66, such as screws or rivets, in order to limit the travel of the members 91 in the members 92 when a member 91 is engaged in a member 92.

The first members 91 are for example protuberances, protruding relative to the lateral face 73 of the wall 100, whereas the second members 92 form hollow reliefs, of a form complementary to the protuberances of the members 91.

The members 91 and 92 thus make it possible to ensure the assembly and the fixing of the supports 2A and 2B to form the reinforcement of the device 1.

Referring once again to FIGS. 1, 2 and 5, the disposition of the supports 2A and 2B is now described in more detail. As explained previously, the supports 2A and 2B are similar or identical and correspond to two copies of the support 2 described above.

Hereinafter in the description, the elements of the supports 2A and 2B which are the same as those described generally for the support 2 bear the same references, augmented, respectively, by the suffix "A" or "B". The description of the elements of the support 2 can also be transposed to them.

For example, the references 4A and 4B designate, respectively, the body 4 of the supports 2A and 2B. The references 6A and 6B designate, respectively, the plate 6 of the supports 2A and 2B. The same notation convention is applied, in particular, for the conductors 51, 52 and 53, for the separating wall 100 and for the fixing members 91 and 92.

In this example, the bodies 2A and 2B are identical. Consequently, the bodies 4A and 4B are identical to one another and the plates 6A and 6B are identical to one another. The support 2B is nevertheless disposed in reverse symmetry relative to the support 2A, that is to say that the support 2B is turned over relative to the support 2A. The respective lateral faces 73 of each support 2A and 2B are in contact with one another.

In the assembled configuration of the device 1, as can be seen in FIG. 1, the supports 2A and 2B are connected to one another. In particular, the members 92A are inserted into the members 91B, whereas the members 91A are inserted into the members 92B. The walls 100A and 100B are then attached to one another and thus define a contact surface between the supports 2A and 2B. The contact surface is embodied by a joining plane J, given by way of illustration.

In this configuration, the apparatus 200 is received inside the housings 70 respectively defined by the supports 2A and 2B. The conductors 51A, 52A and 53A connect the upstream land 201 of the apparatus 200 to the connector 8A and the conductors 51B, 52B and 53B connect the downstream land 202 of the apparatus 200 to the connector 8B. For example, the end 54A of each conductor 51A, 52A and 53A is aligned with the end 54B of the corresponding conductor 51B, 52B and 53B.

The plates 6A and 6B are staggered heightwise on an axis Z, here disposed vertically, the axis Z being, here, at right angles to the plates 6A and 6B. In other words, in this example, the plate 6A can be likened to a cover mounted on the body 4A, whereas the plate 6B serves as bottom plate for the body 4B. The heightwise staggering between the plates 6A and 6B is, here, such that the plates 6A and 6B are not in contact with one another. Like the plates 6A and 6B, the power connectors 8A and 8B are also staggered heightwise on the axis Z.

In this assembled configuration of the device 1, the electrically insulating separating walls 100A and 100B separate and isolate the conductors 51A, 52A, 53A of the support 2A from the conductors 51B, 52B, 53B of the support 2B. For example, the connectors 8A and 8B form, respectively, an electrical input and output of the device 1.

As illustrated in FIG. 1, the device 1 further comprises a protective cap 300.

The cap 300 is advantageously fixed to the first and second supports 2A and 2B on the front face 71. The cap 300 can be one-piece, or it can be composed of several parts secured to one another. The cap 300 is for example made of plastic material.

The protective cap 300 advantageously comprises a through window 301, giving access to the front face of the apparatus 200, for example to give access to a control member of the apparatus 200. The cap 300 makes it possible in particular to protect the conductors 51, 52 and 53.

To handle the device 1, for example to put it into or take it from a rack, the device 1 can also comprise two gripping handles 400, disposed on the front face 71.

Each handle 400 is, here, respectively secured to one of the supports 2A or 2B. Each handle 400 protrudes relative to the front face 71 of each support 2A or 2B.

Preferably, the handles 400 are of identical forms and are disposed symmetrically to one another, here on either side of the joining plane J.

As an illustrative and not necessarily limiting example, each handle 400 comprises a gripping zone 401 in the form of a cylinder oriented vertically. The handles 400 can be one-piece or else be composed of several add-on parts.

According to optional embodiments, at least one of the two handles 400 comprises a mechanism for indexing the position of the device 1 in the rack.

In the example illustrated, the two handles 400 comprise this mechanism, but, as a variant, only one of them is equipped therewith. In this case, it is understood that the two handles of the device 1 are not then identical. This indexing mechanism is for example contained in the handle 400.

For example, this mechanism is actuated via a manual control trigger 402 for this mechanism, the trigger 402 being disposed inside the handle 400. The trigger 402 here protrudes relative to the gripping surface 401 of the handle 400, so as to be accessible for an operator.

An example of a method for assembling the device 1 is now given for illustrative purposes, in particular with reference to FIG. 2.

Initially, the apparatus 200 is connected to the ends 54A of the conductors 51A, 52A and 53A via the upstream connection land 201, then the ends 54B of the conductors 51B, 52B and 53B are connected to the apparatus 200 via the downstream connection land 202 by offering up the support 2B to the support 2A.

The members 91B are then engaged with the members 92A and the members 91A are engaged with the members 92B. If appropriate, the fixing elements 66 are put in place in the orifices 65 then tightened. The cap 300 is then placed and fixed on the front face 71, then the two handles 400 are disposed and secured respectively on one of the supports 2A or 2B.

Figure 6:
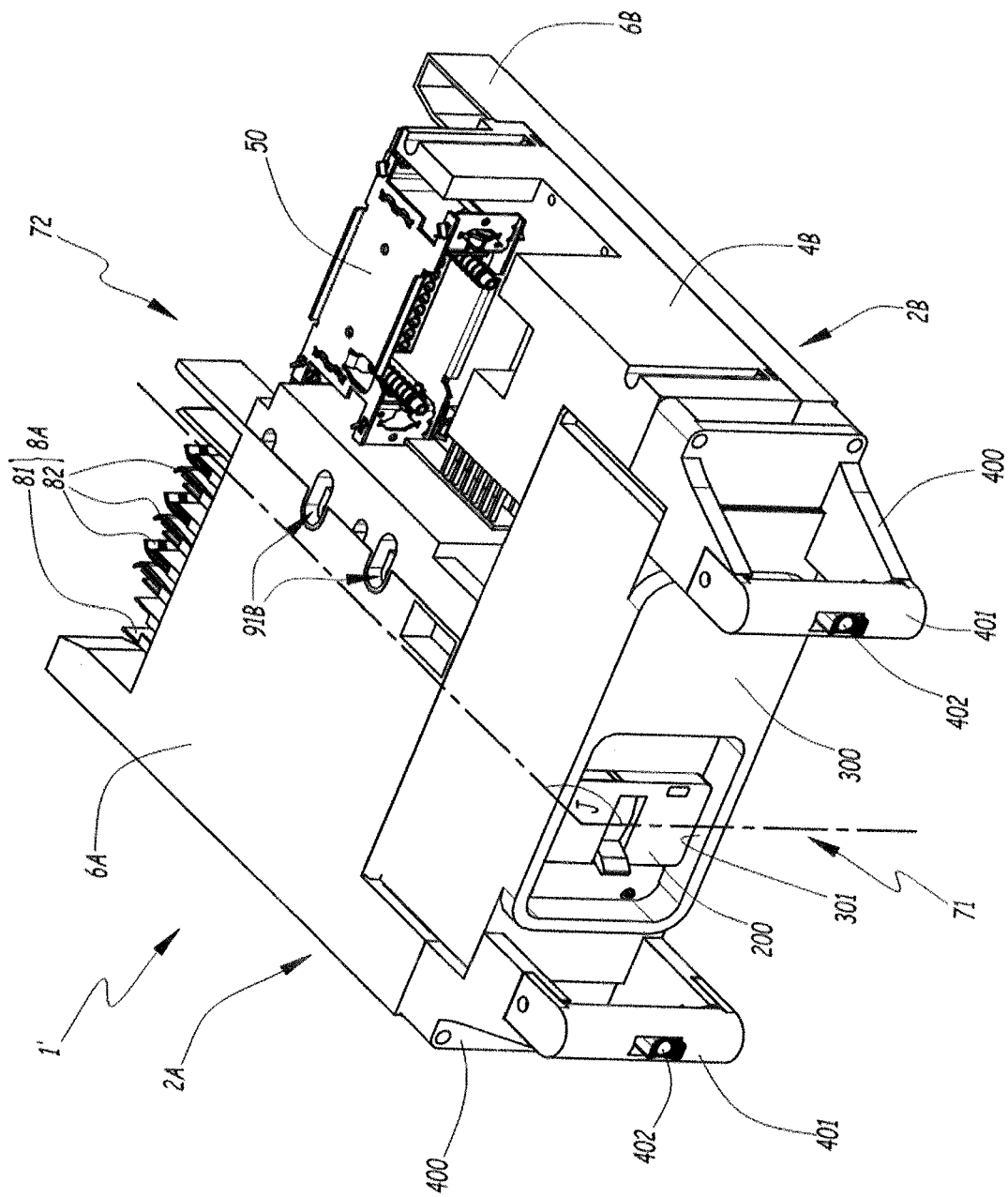
FIG. 6 is an isometric view of an electrical device according to a second embodiment.

FIG. 6 represents an electrical device 1' according to a second embodiment of the invention. The elements of this embodiment which are similar to the first embodiment bear the same references and are not described in detail, inasmuch as the description above can be transposed to them.

Optionally, the support 2 comprises at least one additional housing 75 for receiving an auxiliary electrical apparatus, such as a contactor, and an auxiliary connector 50 disposed at the rear face 72, here on the support 2B.

For example, the auxiliary connector 50 makes it possible to connect the device 1', and in particular the auxiliary electrical apparatus, to the control link or to any other auxiliary electrical circuit of the electrical installation.

Depending on the implementations, the auxiliary connector 50 can be displaced in translation, here parallel to the axis X, between a position deployed towards the rear of the device 1' and outside of the latter, and a retracted position.

For example, the displaceable auxiliary connector 50 makes it possible to implement the intermediate position previously defined.

In the connected position, the device 1' is connected both to the power conductor by its power connectors 8A and 8B, and to the control link by the auxiliary connector 50, which is then in the retracted position. In the intermediate position, called test position, the auxiliary conductor 50 is in its deployed position, which allows it to remain connected to the control link whereas the power connectors 8A and 8B are disconnected from the power conductors.

According to other embodiments that are not illustrated, the auxiliary connector 50 is fixedly mounted on the support 2 of the electrical device. In this case, the intermediate position is not implemented and the auxiliary connector 50 is connected and disconnected simultaneously with the power connector 8 or the connectors 8A and 8B.

Figure 7:
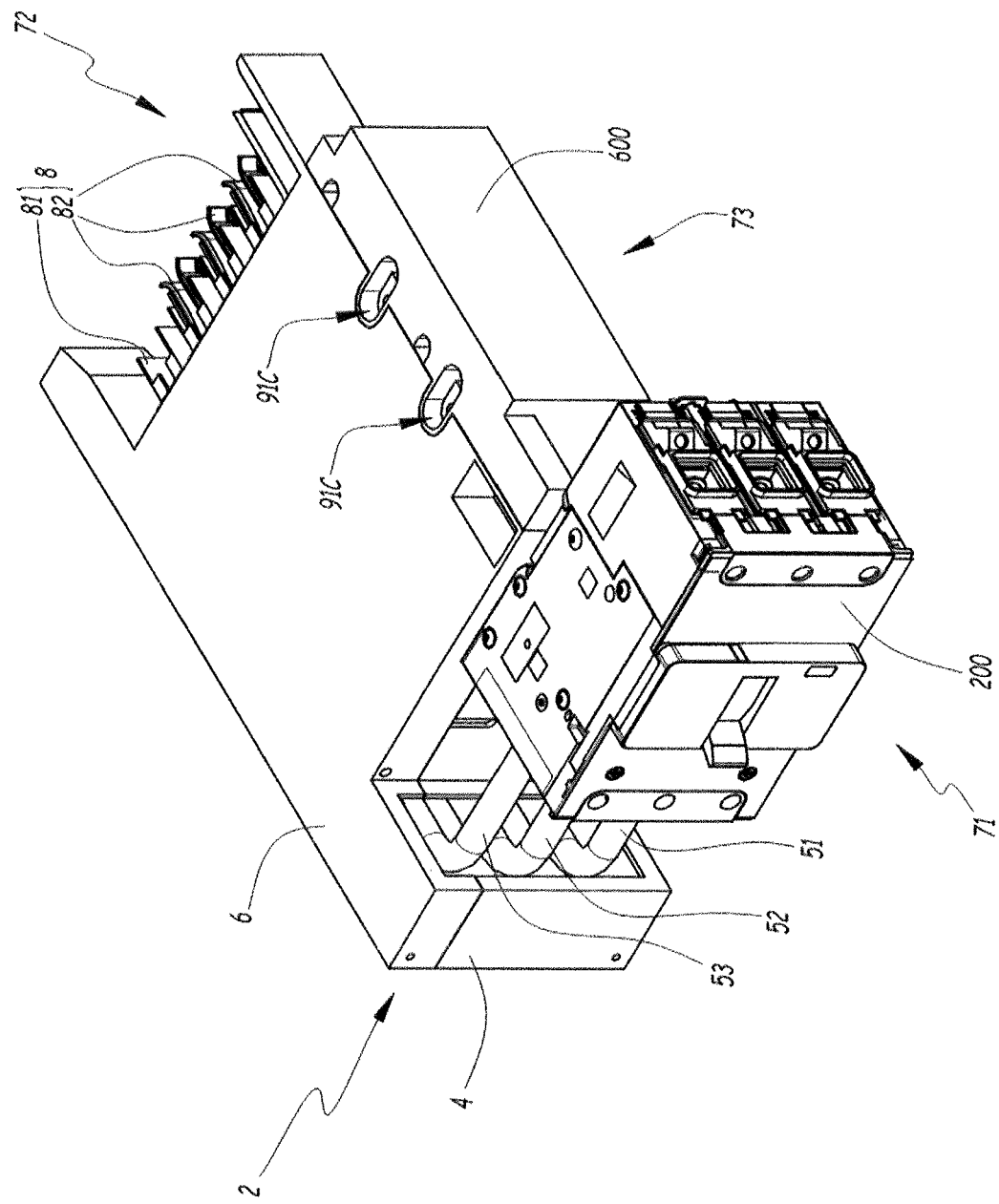
FIG. 7 is an isometric view of the electrical device according to a third embodiment.

FIG. 7 represents a third embodiment of the invention. The elements of this embodiment which are similar to the first embodiment bear the same references and are not described in detail, inasmuch as the above description can be transposed to them.

According to the third embodiment, the device 1 comprises only a single support 2 as defined previously. The support 2 can nevertheless be fixed to an additional, electrically insulating partition 600 external to the support 2 to form an electrical device of more reduced form. The additional partition 600 is then fixed to the wall 100 of the support 2 by means of the fixing system previously described.

The partition 600 comprises a first fixing member 91C similar to the first member 91 and a second fixing member similar to the second member 92, the second member of the partition 600 not being visible in the figures. Thus, in the assembled configuration, the first member 91C is engaged with the second member 92 of the wall 100, whereas the second member of the partition 600 is engaged with the first member 91 of the wall 100. The partition 600 makes it possible to close the body 4 of the support 2. The duly formed assembly can be inserted as such into an electrical installation, or coupled with another element to form another electrical device.

The above embodiments make it possible to construct a rack-mountable electrical device in a modular and simplified manner, in particular by using a reduced number of parts. In particular, since the supports 2A and 2B are similar, even identical, the total number of different parts for forming the device 1 is reduced. That makes it possible to reduce the unit cost of production of the device 1 and to simplify both the industrial scale production and assembly by the client thereof.

The support 2 can thus serve as a basis for constructing different devices and can therefore be used in a large number of different applications.

The assembly system formed by the association of the members 91 and 92 makes it possible to rapidly and simply fix a support 2 to another corresponding element, for example to join the supports 2A and 2B together.

The complementary disposition of the members 91 and 92 on the supports 2A and 2B or, if appropriate, on the support 2 and the partition 600 also ensures a polarizing function and prevents an incorrect or unplanned juxtapositioning of these elements.

Since the support 2 is preassembled, it is not necessary to fully construct the reinforcement of the device, in particular by connecting the apparatus 200 by pulling cable links, which provides a time saving for the assembler.

In particular, the integration of preformed conductors 51, 52 and 53 in the body 4, also preformed, makes it possible, when assembling the device 1, to mount and connect the apparatus 200 rapidly and easily, while ensuring a satisfactory protection and insulation of the conductors 51, 52 and 53, in particular to avoid an accidental electrical connection between the electrical input and output of the device 2.

By virtue of the similar form of the supports 2 and their spatial configuration, the device 1 is reversible and can thus be inserted into a reception rack even after having been turned on itself, for example by rotation on itself about the axis X.

Any feature of one of the embodiments or variants described hereinabove can be implemented in the other embodiments and variants described.

The invention claimed is:

1. Prefabricated support for a rack-mountable electrical device, the support comprising:
   a plate;
   a one-piece body mounted on the plate;
   an electrical connector, placed on a rear face of the prefabricated support;
   preformed electrical conductors each comprising a first end and a second end;
the body defining, on the front face of the support, a reception housing intended to receive an electrical switching apparatus, the body also delimiting a passage in which the electrical conductors are housed, each first end of each electrical conductor being connected to the electrical connector and each second end of each electrical conductor emerging inside the reception housing, the body comprising an electrically insulating separating wall extending at right angles from an edge of the plate, said wall and at least one side of the plate forming a lateral face of the support, said lateral face comprising at least one first fixing member and at least one second fixing member, each second fixing member being of a form complementary to the first fixing member, each first member and each second member being adapted to be engaged with, respectively, another second member and another first member.

2. Prefabricated support according to claim 1, wherein the first fixing member is made of a single piece with the body and the second fixing member is made of a single piece with the plate.

3. Prefabricated support according to claim 1, wherein the body and the plate are produced in an electrically insulating material.

4. Prefabricated support according to claim 1, wherein the first and second members are adapted to be engaged with, respectively, another second member and another first member.

5. Electrical device, comprising, at least one prefabricated support according to claim 1, and an electrical switching apparatus, the electrical switching apparatus being disposed at least partially in the reception housing of the at least one prefabricated support and being connected electrically to the second end of the electrical conductors of the at least one prefabricated support.

6. Electrical device according to claim 5,
   wherein the at least one prefabricated support comprises a single prefabricated support; and
   wherein the device comprises an additional, electrically insulating partition fixed to the separating wall and comprising a first fixing member and a second fixing member similar, respectively, to the first and second members of said support, the first member and the second fixing member of the electrically insulating partition being fitted, respectively, with the second member and the first member of the separating wall, so as to fix the partition to the separating wall.

7. Electrical device according to claim 5,
   wherein the at least one prefabricated support comprises a first prefabricated support and
   a second prefabricated support, the second prefabricated support being identical or similar to the first prefabricated support, the second support being fixed to the first support, the first member of the first support being engaged with the second member of the second support and the second member of the first support being engaged with the first member of the second support and the respective separating walls of the two supports being in contact with one another.

8. Electrical device according to claim 7, further comprising a cap fixed to the first and second supports on the front face of the device.

9. Electrical device according to claim 7, further comprising two gripping handles, each handle being respectively secured to one of said supports, each handle protruding relative to the front face of each support, the handles being identical and disposed symmetrically to one another relative to one and the same joining plane formed by the contact surface between the two supports.

10. Electrical device according to claim 9, wherein at least one of said handles comprises a mechanism for indexing the position of the electrical device in a rack, the handle being equipped with a manual control trigger for this mechanism.

* * * * *